United States Patent

Cawley et al.

[11] Patent Number: 4,812,237
[45] Date of Patent: Mar. 14, 1989

[54] WATER RECYCLE SYSTEM

[75] Inventors: William E. Cawley, Richland, Wash.; Basil W. Mercer, Harrison, Id.

[73] Assignee: Bio Tech, Inc., Richland, Wash.

[21] Appl. No.: 135,696

[22] Filed: Dec. 21, 1987

[51] Int. Cl.[4] .............................................. C02F 3/30
[52] U.S. Cl. .................................... 210/605; 210/610; 210/612; 210/617; 210/631; 210/650; 210/652
[58] Field of Search ............... 210/605, 607, 610, 612, 210/617, 630, 631, 618, 652, 650, 150, 151, 768-771, 748, 754, 620-624

[56] References Cited

U.S. PATENT DOCUMENTS

| | | | |
|---|---|---|---|
| 3,655,048 | 4/1972 | Pergola | 210/769 |
| 3,954,605 | 5/1976 | Davies et al. | 210/631 |
| 4,001,108 | 1/1977 | Hellquist | 210/617 |
| 4,100,073 | 8/1984 | Hopcroft | 210/532.2 |
| 4,210,528 | 7/1980 | Coviello et al. | 210/605 |
| 4,344,826 | 8/1982 | Smith | 210/652 |
| 4,465,594 | 8/1984 | Laak | 210/630 |

*Primary Examiner*—Benoit Castel

[57] ABSTRACT

A closed water purification and recycle system processes domestic wastewater to produce potable water for cooking, drinking and dishwashing and water suitable for general household use, such as washing clothes and personal hygiene. The system consists of septic tanks, a biological sand filter, an ultrafilter, a disinfection unit, pumps, valves, water quality and quantity sensors to monitor and control the process. The system also includes an incinerator toilet to eliminate the need for toilet flush water. Water for cooking, drinking and dishwashing is produced by a still using some of the recycled water for feed. The quality of the recycled water is monitored to assure the product water is suitable for the intended uses. Water thus produced is stored until reused. The system will be automatically shut down if the final product water quality does not meet specifications. Blowdown containing concentrated salts from the still is evaporated and incinerated in the incinerator toilet to maintain a satisfactory concentration of salts in the recycled water. The system equipment is designed and sized to allow unattended operation between inspections, scheduled periodically, at which time routine maintenance is performed and makeup water is added to the system to replace water lost to evaporation.

9 Claims, 1 Drawing Sheet

FLOW DIAGRAM OF THE PROCESS

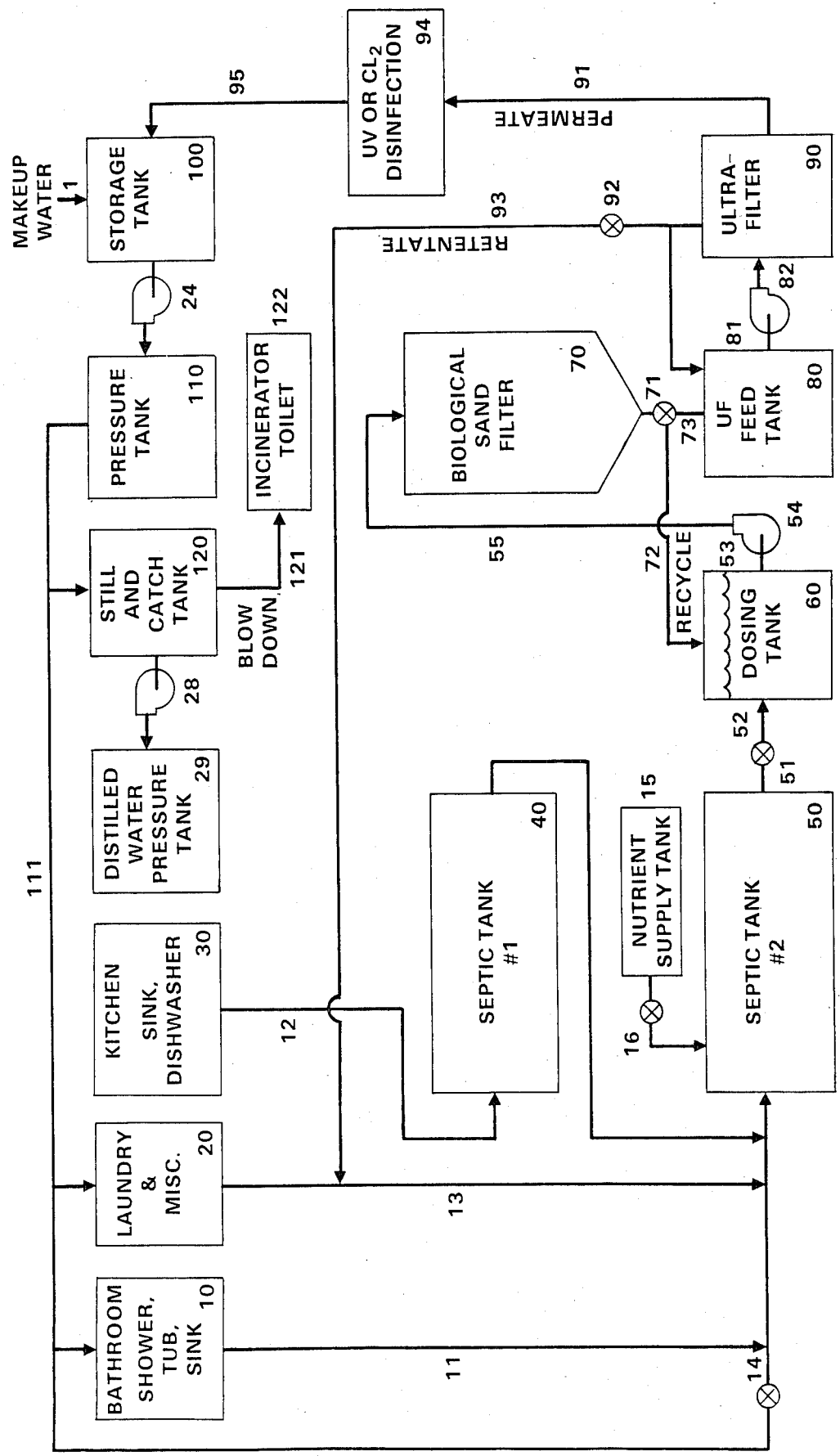
FIG. 1 FLOW DIAGRAM OF THE PROCESS

WATER RECYCLE SYSTEM

BACKGROUND OF THE INVENTION

This invention relates generally to household wastewater process and more particularly to a closed purification and recycling system producing both potable water for cooking, drinking and dishwashing and water of appropriate quality for general household washing activities such as washing clothes and personal hygiene. The system includes an incinerator toilet to dispose of body wastes and to incinerate concentrated salts resulting from the distillation.

Conventional water supplies, used in a household for ingestion, dishwashing, washing clothes, for personal hygiene and for flushing toilets are purified to meet drinking water standards. This water is produced by municipal water treatment plant or onsite wells. After being used once for any of the above mentioned purposes, the wastewater is collected in a common drain and flows, generally by gravity, either to a septic system or to a municipal sewage treatment plant where it is treated to remove pollutants and released to a waterway.

Purifying all water entering a family living unit to meet drinking water standards, including water for flushing toilets, for washing clothes and personal hygiene can be expensive and using it only once is wasteful. However, to be safe, all water to be used for cooking, drinking and dishwashing must meet drinking water requirements for purity and bacteria and virus disinfection as specified in this country by the U.S. Drinking Water Standards. Water for general household uses, such as clothes washing and personal hygiene, can be purified to meet body contact standards. Water suitable for body contact can be processed to meet the required level of purity for much less that the cost of purifying it to meet drinking water standards.

An incinerator toilet may be used to totally eliminate the need for processing water to flush toilets.

The overall effect of these changes in approach to residential water processing makes it economical to recycle the water used in residences by utilization of this water purification and recycle system. The system produces water of the appropriate quality for those activities relation to ingestion and those relationg to general household washing and personal hygiene.

In suburban areas where the current minimum building site size is determined by the area needed for wells and septic systems, the use of this water purification and recycle system will make it feasible to use smaller building sites than is currently possible since utilization of this closed loop water purification and recycle system eliminates the need to provide space for wells and septic systems.

The ground area currently required to accomodate septic systems with associated laterals and wells to serve residential units usually sets the minimum size for rural building sites when subterranean water is available and the ground is suitable for wastewater percolation. When either the water supply is inadequate or polluted and/or the ground is not suitable for percolation, the land currently cannot be used for residential building sites.

Many desirable building sites exist in this country and in many other countries, i.e., property on ocean shores, islands, mountainous regions or other attractive areas. However, much of this land is currently considered "unbuildable" because the available water supply is either polluted or inadequate and/or wastewater cannot be disposed of because the land is not suitable for utilization of a septic system or no municipal sewage treatment plants are located nearby. Much of this land would be useable for residential building sites if the water supply and wastewater disposal problems were eliminated. The purpose of the subject invention is to eliminate both of these problems by providing a water purification and recycle system with the capability of producing a continuous supply of water of the required purity to the occupants of single and multiple family living units. No wastewater will be discharged from the purification and recycle system; therefore, no wastewater discharge permits will be required.

SUMMARY OF THE INVENTION

The water purification and recycle system described in this invention will serve to collect and treat wastewater from various sources in a family dwelling and render the water suitable for reuse in the dwelling. The treatment system will produce two different types of water for reuse: (1) Water suitable for drinking, food preparation and dishwashing and (2) Water suitable for clothes washing and personal hygiene. Body wastes, such as fecal matter and urine, will be processed and disposed of in an incineration toilet and will not be collected for treatment and recycle. These wastes, therefore, will not be intermingled with the recycled water at any time. Exclusion of body wastes from the recycled water will minimize the potential for contamination of the recycled water by pathogenic organisms from this source.

The water used for washing clothes and personal hygiene, etc. must be filtered and disinfected by the addition of chlorine or must be irradiated with ultraviolet rays to assure it does not contain live pathogenic organisms. This water must meet body contact standards. It will not be suitable for drinking because the total dissolved solids (TDS) may exceed the drinking water standard of 500 mg/l TDS.

The wastewater produced by kitchen activities will be directed to a separate septic tank in a unique approach which has a much longer hydraulic retention to allow for more complete anaerobic digestion of organic matter than the standard hydraulic retention time for conventional septic tanks. The kitchen wastewater contains the residue from food preparation, cooking and dishwashing and is heavily ladened with organic material. This flow stream will be sent directly to a septic tank with a hyraulic retention time of approximately 45 days. This stream generally contains the bulk of the organic material found in the effluent from a typical living unit. Processing this stream as described above substantially reduces the overall pollutant load applied to the other filtration components. This, in turn, lengthens the period the system will operate without maintenance. The kitchen effluent, after exiting the first septic tank, will be combined with the effluent from the remaining washing activities in a second septic tank. The combined stream will then be processed through both biological and other filtration processes.

Water to be used for drinking, cooking and dishwashing will be purified to meet the U.S. Drinking Water Standard. Water for this use will be fed to a still or to a Reverse Osmosis (RO) Purification Unit. This water will have previously been purified to meet body contact standards.

The distilled water will be directed to a storage tank and held until needed for cooking, drinking or dishwashing. The blowdown or reject stream from the still or the RO Purification Unit will contain a moderate concentration of salts accumulated in the household effluent by the addition of soaps, detergents, etc. This salt-ladened stream will be periodically directed to a heated tray in ihe incinerator toilet for water dehydration and salt incineration, thus producing a concentrated salt ash for easy disposal.

It is, accordingly, a general object of this invention to provide a method and apparatus for purifying and recycling the water to be used in single or multiple living units for general household clean activities, such as washing clothes, and personal hygiene.

Another object of the invention is to provide a method and apparatus for providing pure water for cooking, drinking and dishwashing for the occupants of the aforesaid living units.

Another object of the invention is to provide a method and apparatus for removal of accumulated salts to maintain an acceptable level of these salts in the recycled water.

Other objects, advantages, and novel features of the invention will be apparent to those of ordinary skill in the art upon examination of the following detailed description of a preferred embodiment of the invention and the accompanying drawings.

BRIEF DESCRIPTION OF THE DRAWINGS

FIG. 1 is a flow diagram of the process.

DESCRIPTION OF THE PREFERRED EMBODIMENT

Referring now to FIG. 1, an overall flow diagram of a typical system describing the invention is shown.

Clean makeup water is initially introduced into the water storage tank 100 to provide the appropriate amount of water for proper operation of the individual system components. Periodically, makeup water is introduced to compensate for water lost through evaporation, etc.

Pump 24 transfers water from the water storage tank 100 to tank 110 and raises the pressure in tank 110 to about 30 psig to provide adequate water pressure for household use. Water flows from tank 110 through supply line 111 to the bathroom shower, tub, and sinks 10, and laundry 20. Water for ingestion is produced by still 120 which reduces the concentration of dissolved solids to acceptable levels for drinking and food preparation. Feed water is supplied to the still via line 111 from tank 110. Distillate is pumped from still catch tank 120 to the distilled water pressure tank 29 via pump 28. Distilled water is supplied to the kitchen at a pressure of about 30 psig from the distilled water pressure tank 29. Distilled water routed to the kitched is used for drinking, food preparation and dishwashing. Wastewater from food preparation and dishwashing is small in volume but contains the bulk of the organic pollutants discharged to household greywater. The kitchen wastewater is discharged via line 12 to the first septic tank 40 for solids settling and anaerobic digestion of the organic matter. The first septic tank has a hydraulic retention time of approximately 45 days to permit effective anaerobic degradation of the organic matter in the kitchen wastewater. It is anticipated that more than 90% of the Diological Oxygen Demand (BOD) will be removed from the kitchen wastewater in the first septic tank 40, thus reducing the BOD load on subsequent processing steps. The septic tanks will be insulated and heated to accelerate biological degradation of the organic wastes.

Blowdown from the still 120 is composed of residual from evaporation and contains the concentrated salts separated from the distillate. The blowdown is removed from the still via line 121 and is routed to an incinerator toilet 122 for evaporation and incineration to an innocuous ash for disposal to a household solid waste receptacle. In addition to the production of potable water, the still thus provides the means for removal of the salts added to the recycled water through the use of soaps and detergents. The still also provides heat, rejected from the condenser, that is used to maintain optimum temperature for growth of microorganisms in the septic tank and biological sand filter. The still produces the potable water required by the user family. The incinerator toilet also provides the means for incinerating the concentrated salts.

Effluent from the first septic tank 40 is combined with wastewater from the bathroom and laundry for treatment in the second septic tank 50. The second septic tank 50 also provides solids settling and anaerobic degradation of organic matter.

The combined effluent overflows from the second septic tank 50 via line 51 and vale 52 to a dosing tank 60. Valve 52 is controlled by a float switch in the dosing tank 60 which shuts off the overflow if the dosing tank 60 is full. The septic tank has sufficient reserve capacity to hold temporary surges of waste water discharged to the treatment system. Feed water is pumped from the dosing tank 60 on a predetermined time cycle (e.g., hourly) via line 53 by pump 54 through line 55 to the distributing manifold at the top of the biological sand filter 70. The biological sand filter is composed of coarse sand about 27 inches deep supported by gravel. The biological sand filter serves two purposes: (1) filtration of particulate matter from the septic tank effluent and (2) aerobic degradation of residual organic matter by microorganism contained within the interstices of the sand.

During extended periods (.e.g, vacations) when no wastewater is discharged from household facilities, water and a nutrient solution will be added to the treatment system to sustain the microorganisms in the biological sand filter. Feeding of the microorganisms will be accomplished by periodically opening valve 14 to allow water to flow to the second septic tank 50 while simultaneously supplying a nutrient solution from the nutrient supply tank 15 via valve 16 to the second septic tank 50. Valves 14 and 16 are activated by the microprocessor which senses the lack of flow to the dosing tank 60. The nutrient solution will contain concentrated biodegradable substances that are appropriate for the treatment system but that will not decompose in the nutrient supply tank 15.

Heat will be supplied to the septic tanks 40 and 50; the dosing tank 60 and the biological sand filter 70 to maximize biological degradation of organic matter in the septic tanks 40 and 50 and the biological sand filter 70. Waste heat from the still 120 will be used for this purpose. The optimal temperature for the operation of the septic tanks is approximately 95 degrees fahrenheit and the optimal temperature for operation of the biological sand filter 70 is in the range of 70 to 95 degrees fahrenheit.

During routine operation of the system, effluent from the biological sand filter 70 will flow either through the recycle line 72 back to the dosing tank or through the float valve 71 through line 73 to the ultrafilter (UF) feed tank 80. When the UF feed tank 70 is full, the float valve 71 closes and diverts the effluent to the dosing tank 60.

Effluent is pumped from the UF feed tank 80 via Pump 81 and line 82 to the ultrafilter 90. The permeate or filtered water from the ultrafilter 90, flows through Line 91 to the disinfection unit 94. Most of the retentate from the ultrafilter is recycled back to the UF feed tank 80 but a small bleed stream is routed through valve 92 and line 93 to the effluent line 13 from the laundry and thence to second septic tank 50. Particulate matter removed by the filter membranes of the ultrafilter are contained in the retentate and is ultimately routed via the bleed stream 93 to the second septic tank 50 for settling and biological degradation. The permeate from the ultrafilter is free of particulate matter and turbidity; therefore, it will have acceptable clarity. Color bodies resulting from large molecular structures, such as humic acids, can be removed by the ultrafilter through selection of membranes with small pore sizes. Color bodies may also be removed by the alternative method of activated carbon adsorption.

The combination of anaerobic and aerobic biological treatment with ultrafiltration produces a well stabilized water that will minimize the growth of slimes or other objectionable biological growths at the points of use of the recycled water. Ultraviolet or chlorine disinfection is provided by the disinfection Unit 94 to kill any pathogenic organisms in the water. Effluent from the disinfection unit 94 flows via the line 95 to the water storage tank 100 for further use.

The pumps and valves in the system will be controlled by the microprocessor based upon the signals of installed sensors at the appropriate locations in the process piping. Tubidity, resistivity, etc., will be continuously monitored. The output from the sensors will be used to control the flow of water, i.e., recycle the water being processed, etc., within the system to assure the final product water meets specifications. If the sensors indicate the product water does not meet the required specification, the microprocessor will shut the system down and signal the faulted condition to maintenance personnel. The system will have substantial pure water storage capacity to allow the persons using the system to continue using water from the pure water supply tank for several days following a fault; thus allowing system maintenance to be done on a routine basis.

Water storage capacity and filter surface area are sized to allow routine operation of the system for an extended period of time between preventive maintenance inspections and supply of makeup water. Water will be lost to evaporation during clothes drying, etc., in addition to the salt-laden water to be evaporated in the incineration toilet to maintain the desired level of salts in the recycled water.

It will be appreciated by those skilled in the art that the embodiments of the invention described above may be subject to considerable modification in order to achieve the basic goal, i.e., a water purification and recycle system that can operate in a closed cycle for an extended period without operator intervention or maintenance and without frequent water makeup. Additional applications for this invention may be developed, such as use for multiple dwellings, houseboats, etc., without departing from the scope and spirit of the appended claims.

We claim:

1. A process for purifying and recycling household waste waters comprising the following steps:
    (a) collecting a first wastewater stream from household kitchen sources;
    (b) anaerobically digesting said first wastewater stream in a first septic tank;
    (c) collecting a second wastewater stream from household laundry and bathing sources;
    (d) combining water from steps (b), (c), and (h);
    (e) anaerobically digesting water from step (d) in a second septic tank;
    (f) pumping water from step (e) over a biological sand filter under aerobic conditions;
    (g) pumping biologically filtered water from step (f) through an ultrafilter thereby separating the biologically filtered water into a retentate stream and a permeate stream;
    (h) returning said retentate stream to step (d);
    (i) disinfecting said permeate stream;
    (j) returning a first portion of said disinfected permeate stream to household laundry and bathing facilities;
    (k) separating a second portion of said disinfected permeate stream into a low salt portion and a high salt portion;
    (l) returning said low salt portion to a household kitchen; and
    (m) disposing of said high salt portion.

2. The process of claim 1, wherein the anaerobic digestion of step (b) is characterized by a hydraulic retention time of at least about 45 days.

3. The process of claim 1, wherein the disinfection of step (i) is performed by chlorination.

4. The process of claim 1, wherein the disinfection of step (i) is performed by ultraviolet irradiation.

5. The process of claim 1, wherein the separation of step (k) is performed by distillation.

6. The process of claim 1, wherein the separation of step (k) is performed by reverse osmosis.

7. The process of claim 1, wherein the disposing of said high salt portion of step (m) is performed by incineration in an incinerating toilet.

8. The process of claim 1, further comprising adding nutrients to the second septic tank.

9. The process of claim 1, further comprising maintaining the biological sand filter at a temperature of 70-85 degrees fahrenheit and the septic tanks at approximately 95 degrees fahrenheit.

* * * * *